Aug. 30, 1932.  J. D. DYER  1,875,227
AUTOMOBILE WINDSHIELD AND CORNER POST CONSTRUCTION
Filed Sept. 18, 1930
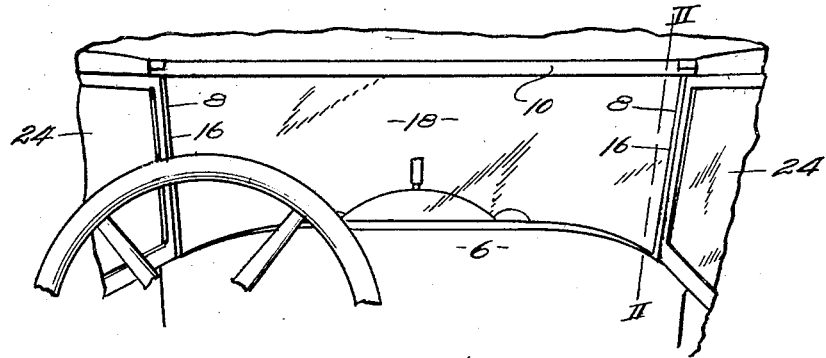
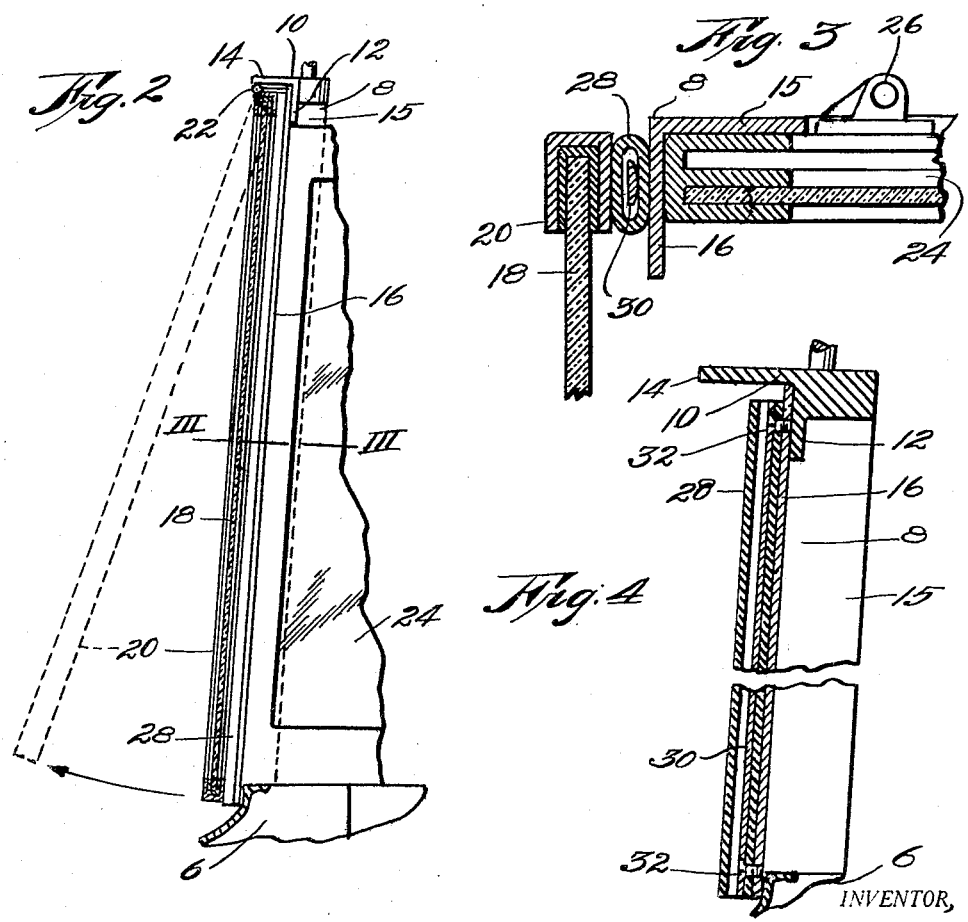
INVENTOR,
James D. Dyer.
BY
*Horey I. Hamilton*
ATTORNEYS.

Patented Aug. 30, 1932

1,875,227

UNITED STATES PATENT OFFICE

JAMES D. DYER, OF KANSAS CITY, MISSOURI

AUTOMOBILE WINDSHIELD AND CORNER POST CONSTRUCTION

Application filed September 18, 1930. Serial No. 482,738.

This invention relates to automobile structures and particularly the windshield and corner post construction of both open and closed type automobile bodies, and the primary object of the invention is to provide a new combination of elements affording a larger and unobstructed area of vision than has heretofore been found in the ordinary automobile structure.

Another object of the invention is the provision of a corner post and windshield construction wherein is provided proper and effective sealing elements between the same, whereby to preclude the entrance of the elements around the post when the windshield is in the closed position.

It is well known in this art that the frame of the hingedly mounted windshield outlines the area of vision for the driver and in practically all instances the windshield frame is disposed in such a manner that it obstructs the vision along lines extending at certain angles from the eye of the driver. Corner post constructions also are bulky and in most instances the windshield is hung in a fashion which adds an even greater thickness to the obstruction at the corner of the automobile body.

With these points of construction in mind, it is an object of the instant invention to provide a pair of substantially vertical corner posts constructed of angle iron, and joined at their upper ends by a connecting member, to which the windshield is hingedly secured. In combination with this structure, the invention provides a windshield having frame sides which lie in front of the angle bar standard forming the corner post and which are narrower than the front wall thereof, allowing the transparent portion of the windshield to overlap the corner post, whereby to cause the edge of said posts to define the end of the vision area.

The invention disclosed herein further contemplates the provision of a windshield and corner post construction wherein one of the specific elements is the windshield frame sides which is narrower than the adjacent corner post and which, when in the operative position, is disposed entirely within the confines of the forwardly projected planes of the vertical edges of the respective corner post.

An even further object of this invention and one of the details thereof forming an important element in this novel combination is the sealing element carried along the front side wall of the angle bar standard forming the corner post. This sealing element preferably comprises resilient means which adjust itself to the space between the windshield frame and the corner post when the same are assembled in the closed position.

A further feature of the sealing element lies in the renewable feature which permits a layman to replace the sealing element without the aid of special tools for equipment.

The specific construction of the elements shown in the accompanying drawing illustrates but the preferred form of the invention. The combination is a novel one and will be specifically set forth in the accompanying specification referring to the drawing, wherein:

Figure 1 is a perspective view looking forward from the driver's seat of an automobile, having windshield and corner post construction made in accordance with this invention.

Fig. 2 is an enlarged vertical section through the windshield taken on line II—II of Fig. 1.

Fig. 3 is an even further enlarged fragmentary detailed view of the construction and combination of elements, taken on line III—III of Fig. 2, and Fig. 4 is an enlarged fragmentary vertical sectional view through the front wall of the corner post and the sealing element carried thereby.

In describing the construction shown in the accompanying drawing, like reference characters are used to designate similar parts throughout the several views and the numeral 6 indicates the automobile body to which is rigidly secured the two angle bar standards 8, ordinarily known as the corner posts. These standards are fastened to the body 6 at their lower ends and project upwardly and rearwardly as shown in Fig. 2. Their upper ends are joined by a connecting member 10 which is in the form of an angle having a downwardly projecting wall 12 and an outwardly projecting wall 14. Standards 8 are also formed of angle members each having a rearwardly projecting wall 15 and a wall projecting toward the other standard 8. This front wall 16 presents the surface against which a sealing element lies when the completed structure is assembled.

As one of the important elements of combination, the invention contemplates a hingedly mounted windshield having a transparent sheet 18 supported by a windshield frame 20. As illustrated in Fig. 2, this windshield is hingedly mounted and directly carried by the forwardly extending wall 14 of connecting member 10. The hinge 22 which forms the connection between member 10 and the windshield frame 20 underlies wall 14 and permits the windshield to swing to and from the closed position in front of angle bar standards 8 forming the corner posts of the structure. As illustrated in Fig. 3, windshield frame sides forming a part of the frame 20 are much narrower than the front wall 16 of standards 8. Thus when the windshield is closed the frame sides will lie entirely within the confines of the projected planes of the edges of standards 8, when said planes are projected forwardly. Manifestly, the front walls 16 of the standards 8 will overlap the transparent sheet 18 of the windshield and the vision area will be outlined by the edges of these walls 16 in so far as the two ends of the windshield are concerned.

The construction and combination of parts just above set forth allows for a very narrow obstruction at the corner of the automobile body. The windshield frame 20 does not add to the width of the corner posts 8 and the blind spot usually presented before the driver is reduced to a minimum. In the case of the construction shown in Fig. 3, the side door 24 of the automobile 6 is hinged as at 26, and the upper portion thereof projects forwardly of the hinge 26 to lie against wall 14 of corner post 8 and immediately behind wall 16 thereof. In case the rearwardly extending wall 15 of post 8 is on the side opposite from that shown in the drawing, the hinge 26 may be fastened to said post and the same becomes a stop or jamb as well as the support. This is also true in the embodiment illustrated. Manifestly, the front stile of the door is practically housed within the angle iron and does not add to the size of the above mentioned blind spot.

To present an effectively sealed joint between post 8 and frame 20, it is desired to interpose a sealing element lying against the outer surface of wall 16 to engage the side members of frame 20 when the windshield is closed. This sealing element is preferably a tubular member 28 formed of resilient material, such as rubber, and secured in the operative position by a securing unit 30, which passes longitudinally therethrough and engage by a fastening device 32 at each end thereof. This securing unit should be a flat band or similar material which will lend rigidity to the tubular element 28 and retain the same snugly against wall 16. As shown in Fig. 3, the tubular member-engaging side of band 30 is arcuate in cross section to conform to the inner radius of said member when it is in normal position with the windshield opened and its pressure upon the member 28 entirely removed. As the windshield is moved toward the opened position as illustrated by the dotted lines in Fig. 2, the tubular element 28 will move from its distorted condition as shown in Fig. 3 and follow the frame side of the windshield until its full normal diameter is reached. Obviously, a slight variation or twist in the windshield when closing the same tightly might be present without creating a leak.

Having thus described the invention, what I claim is new and desire to secure by Letters Patent is:

1. An automobile windshield and corner post construction, comprising a pair of angle posts each having a rearwardly extending wall and a wall projecting toward the opposite post, an angle member connecting the upper ends of said posts having a downwardly extending wall and forwardly extending wall and a windshield hingedly supported by the forwardly extending wall of the connecting member, the forwardly extending wall overhanging said windshield, the frame sides of said windshield being disposed in front of the walls of said posts extending toward each other and being narrower than the posts, said frame top being positioned forwardly of the downwardly extending wall and being narrower than the same whereby the vision area is outlined at the sides of said windshield by said corner post walls and along the top of said windshield by the downwardly extending wall.

2. In a windshield structure, a pair of posts, a member connecting the upper ends of said posts, a forwardly projecting wall along said member, a windshield hingedly supported by said forwardly projecting wall, and a sealing element between said windshield and each post respectively when said windshield is in the closed position, said sealing elements each consisting of a length of tubular resilient material, a fastening band longitudinally coextensive with said tubular material, and screws securing said band and tubular material to the post, said screws being spaced inwardly from the ends of said fastening band and material whereby the heads thereof are confined within said tubular resilient material.

In testimony whereof, I hereunto affix my signature.

JAMES D. DYER.